(12) United States Patent
Hutsler

(10) Patent No.: US 10,404,050 B2
(45) Date of Patent: Sep. 3, 2019

(54) WIRE SEAL FOR PROVIDING INGRESS PROTECTION

(71) Applicant: Nidec Motor Corporation, St. Louis, MO (US)

(72) Inventor: Jeffrey M. Hutsler, Troy, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 15/995,713

(22) Filed: Jun. 1, 2018

(65) Prior Publication Data

US 2018/0351341 A1     Dec. 6, 2018

Related U.S. Application Data

(60) Provisional application No. 62/514,610, filed on Jun. 2, 2017.

(51) Int. Cl.
*H02G 15/196* (2006.01)
*H02G 15/013* (2006.01)
(Continued)

(52) U.S. Cl.
CPC ....... *H02G 15/196* (2013.01); *H01R 13/5205* (2013.01); *H02G 15/013* (2013.01); *H02G 15/046* (2013.01); *H02G 3/088* (2013.01)

(58) Field of Classification Search
CPC .......................... H02G 15/196; H01R 13/5205
(Continued)

(56) References Cited

U.S. PATENT DOCUMENTS 5,927,892 A * 7/1999 Teh-Tsung ........... H02G 3/0675
                                                        403/259
8,288,667 B2 * 10/2012 Chiou .................. H02G 3/0658
                                                        174/652
(Continued)

FOREIGN PATENT DOCUMENTS

EP            0528534        2/1993
JP            4163957        10/2008
(Continued)

OTHER PUBLICATIONS

PCT International Search Report and Written Opinion from PCT Application No. PCT/US2018/035664 entitled Wire Seal for Providing Ingress Protection (dated Oct. 29, 2018).

*Primary Examiner* — Andargie M Aychillhum
*Assistant Examiner* — Michael F McAllister
(74) *Attorney, Agent, or Firm* — Hovey Williams LLP

(57) ABSTRACT

A seal assembly for a longitudinally extending cable comprises a gland shiftable between an unsealed position and a sealed position, and a receiver including an inner portal-defining wall that defines a portal configured to receive at least a portion of the cable. The gland is at least in part received within the portal when in the sealed position. The receiver defines a radially extending, annular receiver face. The gland includes a tapered body configured to circumscribe the cable. The gland further includes a head including an outwardly extending flange. The flange presents a radially extending, annular seal face that engages the receiver face when the gland is in the sealed position. The tapered body presents an axially tapering outer wall that is spaced in its entirety radially inwardly from the portal-defining wall when the gland is in the sealed position, such that an annular buffer is defined therebetween.

20 Claims, 6 Drawing Sheets

(51) Int. Cl.
    *H01R 13/52*     (2006.01)
    *H02G 15/04*     (2006.01)
    *H02G 3/08*      (2006.01)

(58) Field of Classification Search
    USPC ....................................................... 174/23 R
    See application file for complete search history.

(56) References Cited

U.S. PATENT DOCUMENTS

| | | | |
|---|---|---|---|
| 8,367,944 B2* | 2/2013 | Chiou | H02G 3/0691 |
| | | | 174/480 |
| 9,528,639 B2 | 12/2016 | Kimbrell et al. | |
| 2010/0003001 A1 | 1/2010 | Hand | |
| 2011/0226084 A1* | 9/2011 | Chiou | F16C 1/102 |
| | | | 74/502.4 |
| 2013/0213176 A1* | 8/2013 | Chiou | F16C 1/102 |
| | | | 74/502.4 |
| 2015/0200530 A1* | 7/2015 | Chiu | H02G 15/007 |
| | | | 174/653 |

FOREIGN PATENT DOCUMENTS

| KR | 101606106 | | 3/2016 |
|---|---|---|---|
| KR | 1020170058190 | * | 5/2017 |

* cited by examiner

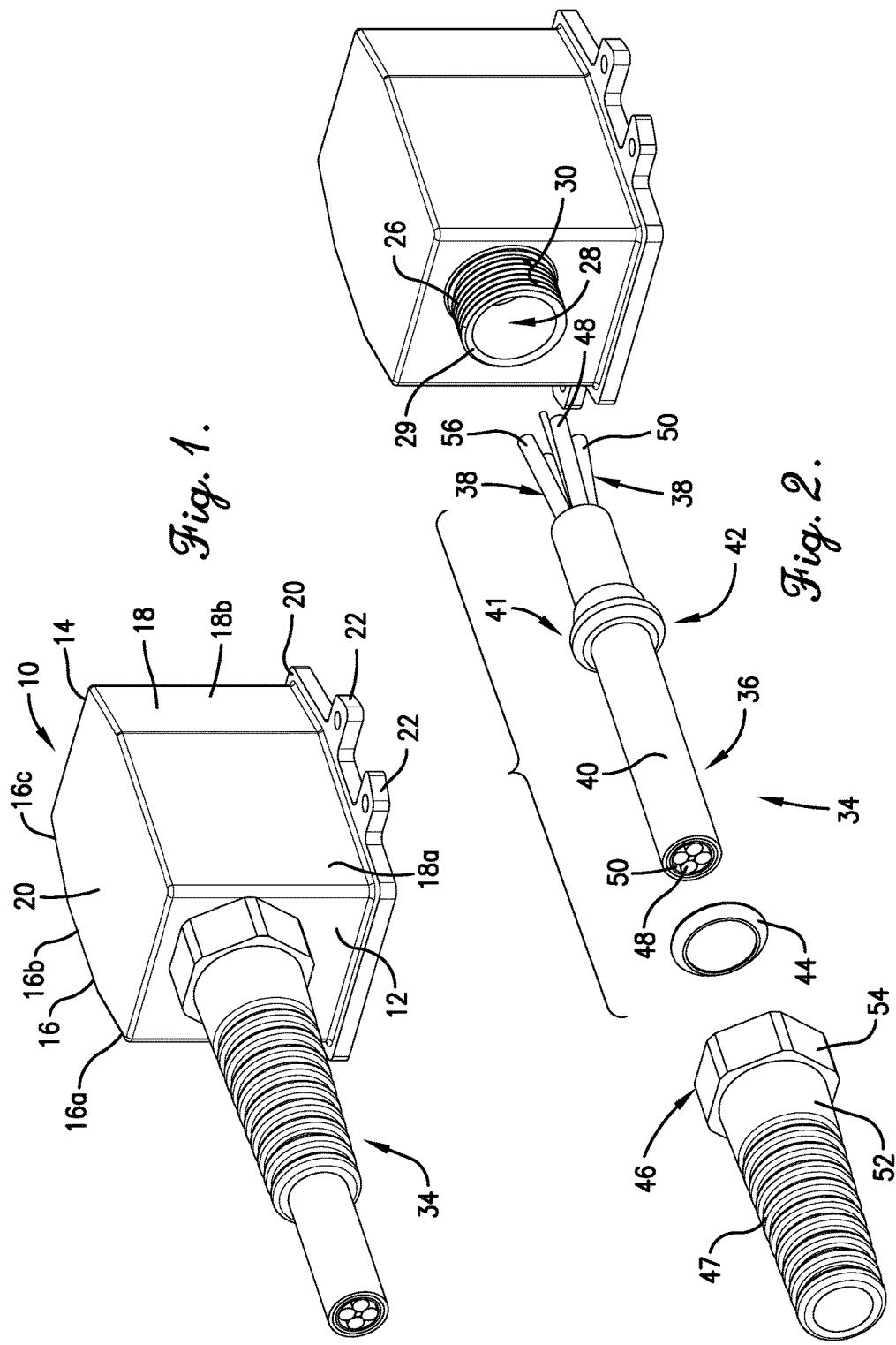

WIRE SEAL FOR PROVIDING INGRESS PROTECTION

CROSS-REFERENCE TO RELATED APPLICATIONS

1. Priority Applications

The present application claims priority from U.S. Provisional Patent Application No. 62/514,610, filed Jun. 2, 2017, and entitled WIRE SEAL FOR PROVIDING INGRESS PROTECTION, the entire disclosure of each of which is hereby incorporated by reference herein.

BACKGROUND OF THE INVENTION

1. Field of the Invention

The present invention relates generally to cable sealing in applications requiring ingress protection. For instance, one embodiment of the present invention relates to an electric motor assembly including a conduit box. A cable seal is provided to at least substantially prevent ingress of contaminants (e.g., dust, moisture, etc.) into the conduit box at the site of cable pass-through. Although a variety of motor types and applications are contemplated, in a preferred embodiment, the cable seal is associated with a turntable motor for use in a warehousing system robot.

2. Discussion of the Prior Art

Those of ordinary skill in the art will appreciate that cable sealing techniques conventionally require and/or result in the application of radially compressive forces on the cable. Such forces may have detrimental effects on the cable, including but not limited to deformation of one or more internal wires or conductors of the cable, generation of friction amongst such wires or conductors, and generation of friction between such wires and conductors and a cable coating or other adjacent structures.

The effects of such conventional sealing techniques may also vary widely depending on the disposition of the cable. When extending in a generally straight line, for instance, the cable might or might not be well suited to withstand the associated compressive forces acting thereon. Curving of the cable, on the other hand, might result in formation of stress concentrations therein that are exacerbated by the compressive forces associated with the seal. For example, the associated compressive forces from the seal might be so strong as to prevent longitudinal shifting of internal conductors past one another during flexing, resulting in frictional forces, bending stresses, etc.

SUMMARY

According to one aspect of the present invention, a seal assembly for a longitudinally extending cable is provided. The seal assembly comprises a gland shiftable between an unsealed position and a sealed position. The seal assembly further comprises a receiver including an inner portal-defining wall that defines a portal. The portal is configured to receive at least a portion of the cable. The gland is at least in part received within the portal when in the sealed position. The receiver further defines a radially extending, annular receiver face. The gland includes a tapered body configured to circumscribe the cable. The gland also includes a head integrally formed with the tapered body and including an outwardly extending flange. The flange presents a radially extending, annular seal face that engages the receiver face when the gland is in the sealed position. The tapered body presents an axially tapering outer wall. The outer wall is spaced in its entirety radially inwardly from said portal-defining wall when the gland is in the sealed position, such that an annular buffer is defined between the portal-defining wall and the outer wall and extends axially from the seal face.

BRIEF DESCRIPTION OF THE DRAWING FIGURES

Preferred embodiments of the invention are described in detail below with regard to the attached drawing figures, wherein:

FIG. 1 is a perspective view of a conduit box and pass-through assembly in accordance with a preferred embodiment of the present invention;

FIG. 2 is an exploded perspective view of the conduit box and pass-through assembly of FIG. 1;

Figure 3:
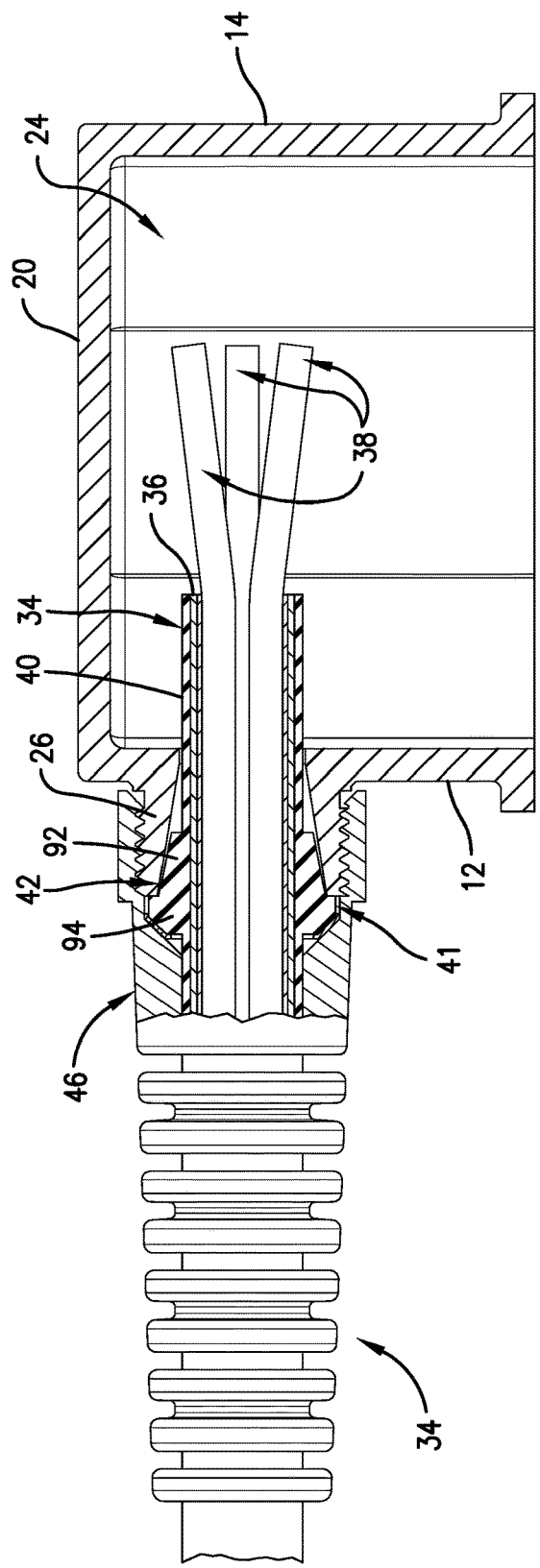
FIG. 3 is a cross-sectional side view of the conduit box and pass-through assembly of FIGS. 1 and 2.

The drawing figures do not limit the present invention to the specific embodiments disclosed and described herein. While the drawings do not necessarily provide exact dimensions or tolerances for the illustrated components or structures, the drawings are to scale with respect to the relationships between the components of the structures illustrated in the drawings.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein and unless otherwise specified, the terms axial, axially, and variations thereof mean the defined element has at least some directional component along or parallel to the axis. These terms should not be limited to mean that the element extends only or purely along or parallel to the axis. For example, the element may be oriented at a forty-five degree (45) angle relative to the axis but, because the element extends at least in part along the axis, it should still be considered axial. Similarly, the terms radial, radially, and variations thereof shall be interpreted to mean the element has at least some directional component in the radial direction relative to the axis, unless otherwise specified.

It is further noted that, unless otherwise specified, the term annular shall be interpreted to mean that the referenced object extends around a central opening so as to be generally toroidal or ring-shaped. It is not necessary for the object to be circular, nor does the object have to be continuous.

Similarly, unless otherwise specified, the term toroidal shall not be interpreted to mean that the object must be circular or continuous.

DETAILED DESCRIPTION OF THE PREFERRED EMBODIMENTS

FIGS. 1-3 a illustrate a conduit box 10 including a front wall 12, a rear wall 14, a pair of sidewalls 16 and 18, and a top wall 20 extending between and interconnecting the walls 12, 14, 16, and 18. The conduit box 10 also preferably includes a flange 20 and mounting tabs 22 for mounting the conduit box to an associated structure or fixture (e.g., a motor housing, etc.) such as a turntable motor or other motor (not shown).

In the illustrated embodiment, the sidewall 16 includes three (3) sidewall portions 16a, 16b, and 16c angled relative to one another. The sidewall 18, in contrast, includes two (2) angled sidewall portions 18a and 18b. The top wall 20 is thus preferably heptagonal. Flat, homogenous sidewalls and a corresponding rectangular top wall are permissible, however, as are other combinations of walls or wall portions. That is, more or fewer walls or wall portions may be provided, and such walls or wall portions may be curved, flat, etc. in keeping with the particular requirements of the conduit box itself and/or the associated structure.

The walls 12, 14, 16, 18, and 20 preferably define a conduit box chamber 24. The conduit box chamber 24 is configured to receive wiring and connecting elements therein, as required for the particular application.

A receiver 26 cooperates with one of the walls 12, 14, 16, 18, or 20 to define a portal 28 fluidly interconnected with the chamber 24. In the illustrated embodiment, for instance, the receiver 26 extends from the front wall 12.

The receiver 26 is preferably integrally formed with the front wall 12. For instance, in a preferred embodiment, the conduit box 10 and the receiver 26 are part of a single casting (e.g., of aluminum), although non-integral formation is permissible according to some aspects of the present invention.

The receiver 26 preferably presents an annular end or receiver face 29 extending radially and circumferentially to be generally orthogonal to an axis of the portal 28. Non-orthogonal configurations are permissible, however, according to some aspects of the present invention. The receiver 26 also preferably presents a threaded outer face 30 including threads 32. The receiver 26 and the portal 28 preferably present circular cross-sections, with portions thereof being tapered in a manner discussed in greater detail below, although deviations are permissible according to some aspects of the present invention. However, as will be discussed in greater detail below, it is preferred that at least the threaded outer face 30 of the receiver 26 be generally cylindrical to enable threading of a component thereonto. As will also be discussed below, the shape of the portal 28 is also preferably complementary to adjacent components.

A pass-through assembly 34 preferably extends through the portal 28 and into the chamber 24. More particularly, the pass-through assembly 34 preferably includes a cable or harness 36 (illustrated herein as a multi-conductor cable or harness 36 including a plurality of electrical conductors 38 and a multi-layer sheath 40 encircling the conductors 38); portions of a seal assembly 41 that includes a grommet or gland 42, a washer 44, an open-end dome nut 46, in addition to the aforementioned receiver 26; and a flexible sleeve 47. In the illustrated embodiment, each conductor 38 includes one or more wires 48 and a coating 50 over the wires 48.

It is particularly noted that the cable might be configured in a variety of ways without departing from the scope of the present invention. For instance, the cable might be a multi-conductor or -filament cable, as illustrated, or include only a single conductor or filament. The sheath might be single-layer, multi-layer, or omitted entirely. The sheath layers might include shield or jacket layers for a variety of purposes, including but not limited to thermal insulation, electrical insulation, crush resistance, abrasion resistance, and cut resistance. The wires might be electrical wires of one or more phases, fiber optic filaments, etc. The cable might additionally or alternatively include drains or fillers. Any wires or filaments may be coated or uncoated.

In summary, a cable as described herein should be understood to include a wide variety of interconnecting or transmitting structural arrangements having a generally longitudinally extending form.

The cable might also be connected at its end in any manner appropriate to the particular application. For instance, a first end might be connected to a power source, while a second end might be connected to relevant components (e.g., control components and/or operational components) or an electric motor.

As will be discussed in greater detail below and as noted briefly above, the pass-through assembly 34 and, in particular, the seal assembly 41, is designed to enable sealing and restraint of the cable 36 relative to the conduit box 10 without compressing the cable 36, thereby enabling the conductors 38 within the cable 36 to move relative to one another when cycled and/or bent repeatedly. In conventional sealing approaches based on compression of the cable by a sealing element, friction is generated between the wires, leading to damage and/or fracture of the wires upon repeated cycling or bending due to their inability to move relative to each other. Thus, the present design increases wire longevity by reducing wire damage.

The pass-through assembly 34 is also designed to provide an appropriate degree of resistance to removal of the cable 36 or individual ones of the conductors 38. More particularly, the pass-through assembly 34 is designed to restrict "pull-out" in a generally longitudinal direction (i.e., along the axis of the cable 36).

Turning now to structural details of the pass-through assembly 34, the dome nut 46 preferably presents a guide portion 52 and a connection portion 54. The guide portion 52 preferably circumscribes the cable 36 and engages the sleeve 47, which itself circumscribes the cable 36 and provides some degree of protection thereto in a manner well known in the art. The connection portion 54 preferably circumscribes both the gland 42 and the receiver 26 connects the dome nut 46 to the receiver 26.

More particularly, the guide portion 52 preferably defines an aperture 56 including a wire portion 58 and a gland portion 60. The wire portion 58 preferably presents a circular cross-section so as to be cylindrical overall. More particularly, the guide portion 52 preferably presents an inner guide wall 62 defining the wire portion 58 and circumscribing the cable sheath 40 so as to engage the cable sheath 40 or be slightly spaced from therefrom. It is particularly noted that, most preferably, any engagement that occurs is without application of compressive forces by the guide portion 52 onto the cable 36.

The guide portion 52 also preferably presents an inner receiving wall 64 defining the gland portion 60. The receiving wall 64 preferably includes an outwardly angled end portion or force-transmitting face 66 extending angularly away from the guide wall 62 (e.g., at an angle between about thirty (30) degrees and about sixty (60) degrees, and most preferably about forty-five (45) degrees). The receiving wall 64 also preferably includes an axially extending bordering wall 68 extending from the force-transmitting face 66. As will be discussed in greater detail below, the receiving wall 64 is preferably sized and shaped to complement the geometry of the gland 42.

The connection portion 54 preferably includes a threaded inner face 70 including a plurality of threads 72 for engaging the threads 32 of the receiver 26. However, alternative means of interconnection (e.g., interference fits, latches, pins, screws, etc.) may additionally or alternatively be used, provided sufficient pull-out strength is provided to fulfil the requirements of the particular application.

Figure 3A:
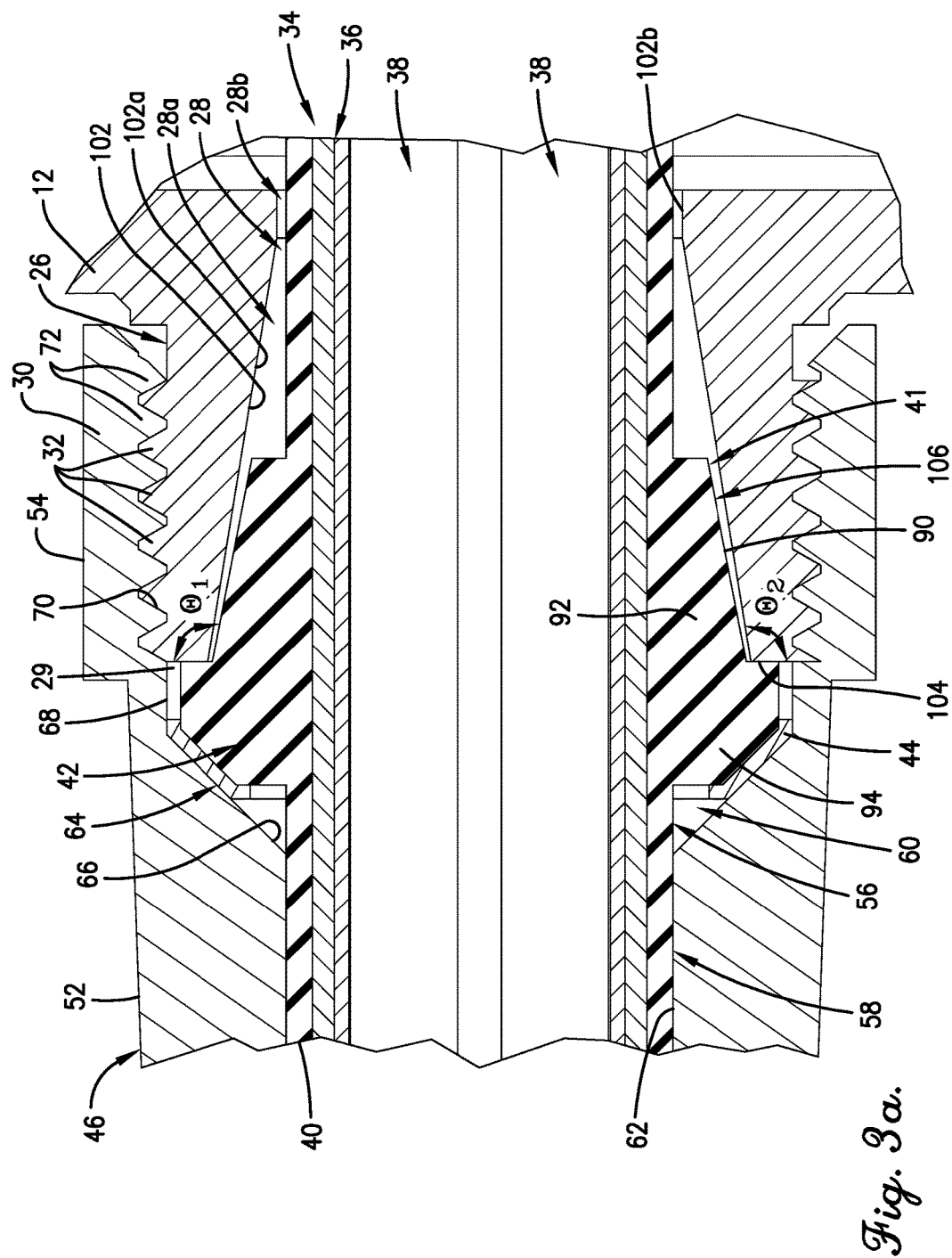
FIG. 3a is an enlarged, cross-sectional side view of a portion of the conduit box and pass-through assembly of FIGS. 1-3.

In a preferred embodiment, the gland 42 is formed during an overmolding process to be integral with the cable sheath 40. (That is, the cable sheath 40 "blends" into the gland 42 as shown in FIG. 3a and others.) Thus, during assembly, the gland 42 and the cable 36 act as a unit, with the gland 42 not applying any radial compressive forces to the cable 36 as a result solely of its connection thereto.

Figure 4:
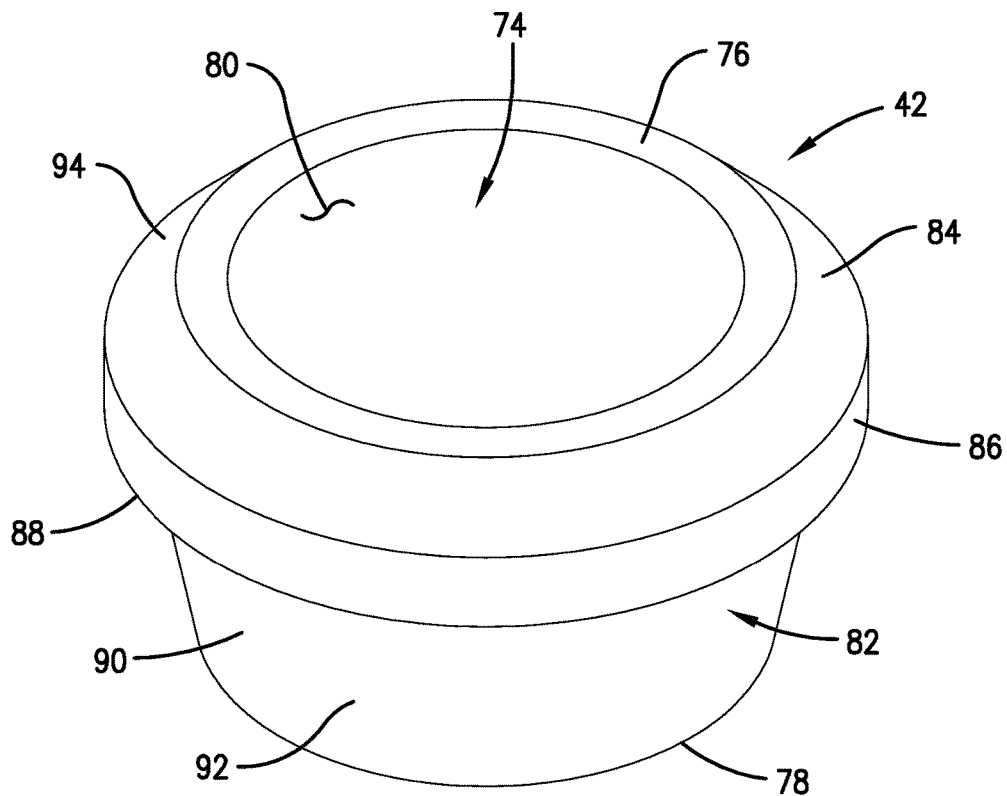
FIG. 4 is a perspective view of the gland of the wire seal assembly of FIGS. 1-3a, separated from the cable.
Figure 5:
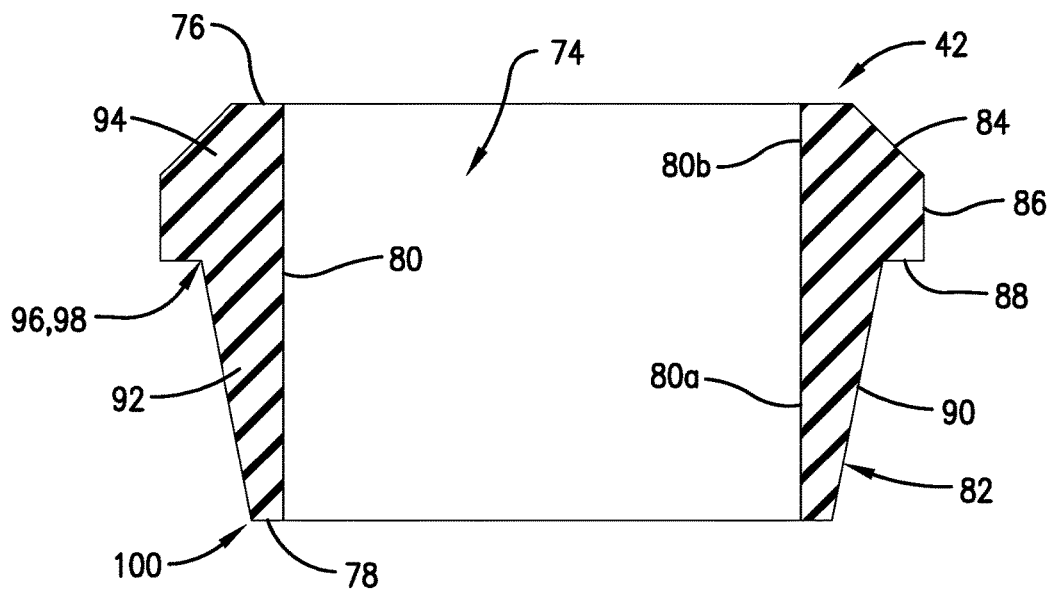
FIG. 5 is a cross-sectional side view of the gland of FIG. 4, separated from the cable.

For purposes of clarity and geometrical description, however, FIGS. 4 and 5 illustrate the gland 42 distinct from the cable 36. As shown, the gland 42 is preferably generally toroidal in form to present an interior lumen 74. More particularly, the gland 42 preferably presents axially spaced apart outer and inner rims 76 and 78, an inner wall 80 defining the lumen 74, and a multi-segment outer wall 82 for engagement with both the nut 46 and the receiver 26. (Of course, as will be readily understood by those of ordinary skill in the art and as shown in FIGS. 1-3a, the inner wall 80 is preferably integral with or co-embodied with the cable sheath 40, with the lumen 74 receiving the cable 36 therethrough.)

The rims 76 and 78 are preferably generally annular and extend radially and circumferentially to be generally orthogonal to an axis of the lumen 74 (and, further, a local axis of the cable 36) and perpendicular to one another. Non-orthogonal configurations are permissible, however, as are non-parallel dispositions.

The inner wall 80 is preferably cylindrical such that the lumen 74 is cylindrical, as well.

The outer wall 82 preferably includes an outwardly angled force-receiving face 84 extending angularly away from the outer rim 76 (e.g., at an angle between about one hundred twenty (120 degrees and about one hundred fifty (150) degrees, and most preferably about one hundred thirty-five (135) degrees). Alternatively described, the force-receiving face 84 preferably extends parallel to the angled force-transmitting face 66 of the receiving wall 64.

The outer wall 82 also preferably includes an axially extending outermost face 86 extending from the force-receiving face 84 in an axial direction to preferably parallel the bordering wall 68.

A generally annular, radially and circumferentially extending seal face 88 preferably extends inwardly from the outermost face 86. The seal face 88 is preferably orthogonal to the axis and parallel to the rims 76 and 78 to thereby likewise be parallel to the receiver face 29. Both the force-receiving face 84 and the force-transmitting face 66 also therefore extend obliquely relative to the receiver face 29 and the seal face 88.

Finally, an axially tapering outer wall or tapered positioning face 90 preferably extends angularly inwardly from the seal face 88 toward the axis to interconnect the seal face 88 and the inner rim 78. The seal face 88 and the positioning face 90 preferably form an obtuse taper angle $\theta_1$ therebetween. More particularly, an angle $\theta_1$ greater than about ninety (90) degrees but less than about one hundred thirty-five (135) degrees is formed. Most preferably, the angle $\theta_1$ is between about one hundred (100) and one hundred three (103) degrees.

Alternatively described in terms of bodies rather than walls, surfaces, and faces, the gland 42 preferably includes a main body 92 and a head 94 extending axially and radially outwardly from the main body 92. The main body 92 is preferably tapered along the axis to present a widest end 96 at an interface 98 with the head 94 and a narrowest end 100 opposite the head 94.

As will be readily apparent to those of ordinary skill in the art, the rim 78, the outer wall 90, a first portion 80a of the inner wall 80, and the head 94 along the interface 98 cooperatively bound or define the main body 92. The rim 76, the force-receiving face 84, the outermost face 86, the seal face 88, a second portion 80b of the inner wall 80, and the main body 92 along the interface 98 cooperatively bound or define the head 94.

As noted previously, the shape of the portal 28 of the receiver 26 is preferably complementary to adjacent components. In particular, the portal 28 is preferably shaped to complement the main body 92 of the gland 42, as well as the cable 36. More particularly, the portal 28 preferably includes a gland portal 28a and a cable portal 28b. In greater detail, the receiver 26 preferably includes an inner portal-defining wall 102 including a gland portion 102a and a cable portion 102b.

The cable portion 102b preferably presents a circular cross-section so as to be cylindrical overall. More particularly, the cable portion 102b preferably circumscribes the cable sheath 40 so as to be spaced from the sheath 40. No compressive force is applied to the sheath 40 by the cable portion 102b.

The gland portion 102a is preferably tapered to angle inwardly from the outermost end or receiver face 29 of the receiver 26 toward the axis, to interconnect the receiver face 29 and the cable portion 102b. The receiver face 29 and the gland portion 102a preferably form an obtuse portal angle $\theta_2$ therebetween. More particularly, the receiver face 29 and the gland-receiving portion 102a preferably form an angle $\theta_2$ greater than about ninety (90) degrees but less than about one hundred thirty-five (135) degrees. Most preferably, the angle $\theta_2$ is between about one hundred (100) and one hundred three (103) degrees.

Thus, as will be readily apparent to those of ordinary skill in the art, both the tapered body 92 and the gland portal 28a are frustoconical in form.

It is particularly noted that, regardless of the exact numerical value, the angle $\theta_2$ between the receiver face 29 and the gland-receiving portion 102a is preferably slightly different than the angle $\theta_1$ between the seal face 88 and the outer wall 90 of the gland 42, such that the outer wall 90 does not engage (or perhaps only incidentally engages, as will be discussed below) the gland-receiving portion 102a. More particularly, it is preferred that the main body 92 of the gland 42 be more tapered than the gland portal 28a. Alternatively stated, the angle $\theta_2$ between the receiver face 29 and the gland-receiving portion 102a is preferably less than $\theta_1$. Such difference is preferably relatively small (e.g., between about zero (0) degrees and about three (3) degrees), although other degrees of disparity are permissible according to some aspects of the present invention.

Preferably, the gland 42 forms a seal 104 with the receiver face 29 of the receiver 26 by means of abutment of the receiver face 29 with the seal face 88. That is, the gland 42 provides at least substantial sealing against ingress of contaminants into the conduit box chamber 24.

The gland 42 preferably comprises a resiliently deformable (i.e., at least substantially elastic at relevant strains) material such as rubber. For instance, in a preferred embodiment, the gland 42 comprises a thermoplastic elastomer (TPE) having a 50 Shore A hardness.

As noted above, in a preferred embodiment, the gland 42 is formed during an overmolding process to be integral with the cable sheath 40 and thereby not apply any radial compressive forces to the cable 36.

However, in alternative embodiments falling within the scope of some aspects of the present invention, a bonding agent (e.g., an adhesive, glue, settable/curable medium etc.) may be provided to secure a separately formed gland to the cable sheath. It is noted that in such embodiments, it is preferred the gland be sized such that lumen thereof is larger than the outer diameter of the cable. The gland therefore will not transmit radial compressive forces to the cable simply by merit of being slipped over the cable and shifted axially therealong. Although it is possible in some instances that overfilling or overprovision of a bonding agent between the gland and cable in such an embodiment might generate some degree of compressive force on the cable, such force would preferably be negligible and significantly smaller than that which would be associated with a conventionally "squeeze-secured" grommet tightly fit onto the cable.

The washer 44 is provided primarily between the force-transmitting face 66 of the dome nut 46 and the receiving wall 64 of the head 94 of the gland 42 to aid in assembly during torquing of the nut 46. More particularly, the washer 44 protects the gland 42 during torquing of the nut 46.

During assembly of the pass-through assembly 34, torquing of the dome nut 46 results in axial shifting of the dome nut 46 and consequent application of axial force to the washer 44 and, in turn, the gland 42 (which, as noted previously, is preferably pre-fixed to the cable 36). More particularly, axial force is transferred from the force-transmitting face 66 to the force-receiving face 84 and results in shifting of the gland 42 from an unsealed position to a sealed position. Alternatively stated, such axial force ultimately facilitates the formation and continuous functionality of the seal 104 between the receiver face 29 and the seal face 88.

Although torquing of the dome nut 46 would in fact additionally lead to a component of force in a radial direction (e.g., a radially compressive force directed toward the cable 36) due to the angled geometry of the washer 44 and the faces 66 and 84, such a force is most preferably relatively small and also at least in part absorbed by the natural deformability of the gland 42. Thus, either no compression is applied to the cable 36 or such compression is negligible (e.g., preferably less than 15% of the total axial load, more preferably less than 10% of the total axial load, and most preferably less than about 5% of the total axial load).

Furthermore, it is noted that axial shifting of the gland 42 from the unsealed position into the gland portal 28a en route to the sealed position is most preferably such that no contact occurs between the outer wall 90 and the gland-receiving portion 102a. More particularly, ideal positioning after assembly (i.e., when the gland 42 is in the sealed position) is such that the outer wall 90 is spaced in its entirety radially inwardly from the gland-defining portion 102a of the portal-defining wall 102a. An annular gap or buffer 106 is thereby defined between the outer wall 90 and the gland-receiving portion 102a, with the buffer 106 extending axially from the seal face 88 and being larger adjacent the inner rim 78 (i.e., adjacent the seal face 88) than adjacent the interface 98.

Should imperfect alignment occur during insertion of the cable 36/gland 42, however, contact between the outer wall 90 and the gland-receiving portion 102 would aid in correction of the poor alignment (i.e., aid in centering of the gland 42 in the gland portal 28a) as axial progress of the gland 42 continues.

It is also noted that the decreasing size of the gap or buffer 106 nearer the interface 98 is such that the tolerance for poor alignment decreases as insertion of the gland 42 progresses. That is, a relatively large amount of "play" or "slop" in positioning is tolerated during the early stages of insertion, with later stages either requiring more accurate centering (e.g., through more careful insertion or via "corrections" imparted by incidental contact between the positioning face 90 and the gland-receiving portion 102a. Again, however, such contact is most preferably avoided and, if it does occur, is most preferably transient or incidental. That is, upon full assembly of the pass-through assembly, contact between the positioning face 90 and the gland-receiving portion 102a is most preferably avoided entirely so as to completely eliminate the transmission of compressive (radial) forces from the receiver 26, to the gland 42, and in turn to the cable 36.

It is also noted that the necessary disparity between taper and portal angles $\theta_1$ and $\theta_2$ to sufficiently reduce contact likelihood varies based on other geometric features of the gland 42. For instance, in the illustrated embodiment, provision of the seal face 88 that extends radially inwardly of the end 29 when the gland 42 is centered in the gland portal 28a aids in providing clearance of the gland 42 with a lower taper angle $\theta_1$ than would be necessary if the seal face 88 and the end 29 were to extend radially inwardly an identical distance (such that the outer wall 90 were to approach infinitely closely to the gland-receiving portion 102a at the interface 98). In contrast, if the seal face were to extend even farther radially inwardly than illustrated, so as to overhang the end even more, it would be permissible according to some aspects of the present invention for the taper angle of the gland to be equal to that of the receiver (so that the positioning face and the gland-receiving portion were parallel) or even less than that of the receiver. However, in the latter two instances, the preferred increasing positioning functionality of the illustrated embodiment would be lost.

The above-described gland 42 and its interactions with the cable 36, the receiver 26, and the nut 46 provide numerous advantages relative to conventional sealing techniques. Among other things, for instance, use of axial compression to seal the conduit box chamber 24 only along the interface between the receiver face 29 and the seal face 88—and not between the outer wall 90 and the gland-receiving portion 102a, or between the inner wall 80 and the sheath 40—enables sealing to be achieved without compression of the wires 48 within the cable 36. More particularly, since the gland 42 does not radially compress the cable 36 (or perhaps only negligibly compresses the cable 36, as discussed above), even after the dome nut 46 is torqued and the gland 42 is in its sealed position, substantially frictionless relative movement (e.g., sliding) between the wires 48 is possible as the cable 36 bends, flexes, or otherwise moves. This degree of freedom, in contrast to a compression-based gland or other form of seal that would substantially restrict relative wire movement, increases the lifespan of the cable 36 by reducing fracture or other damage to the wires 48 due to, for instance, repeated cycling of the harness or cable 36.

Figure 6:
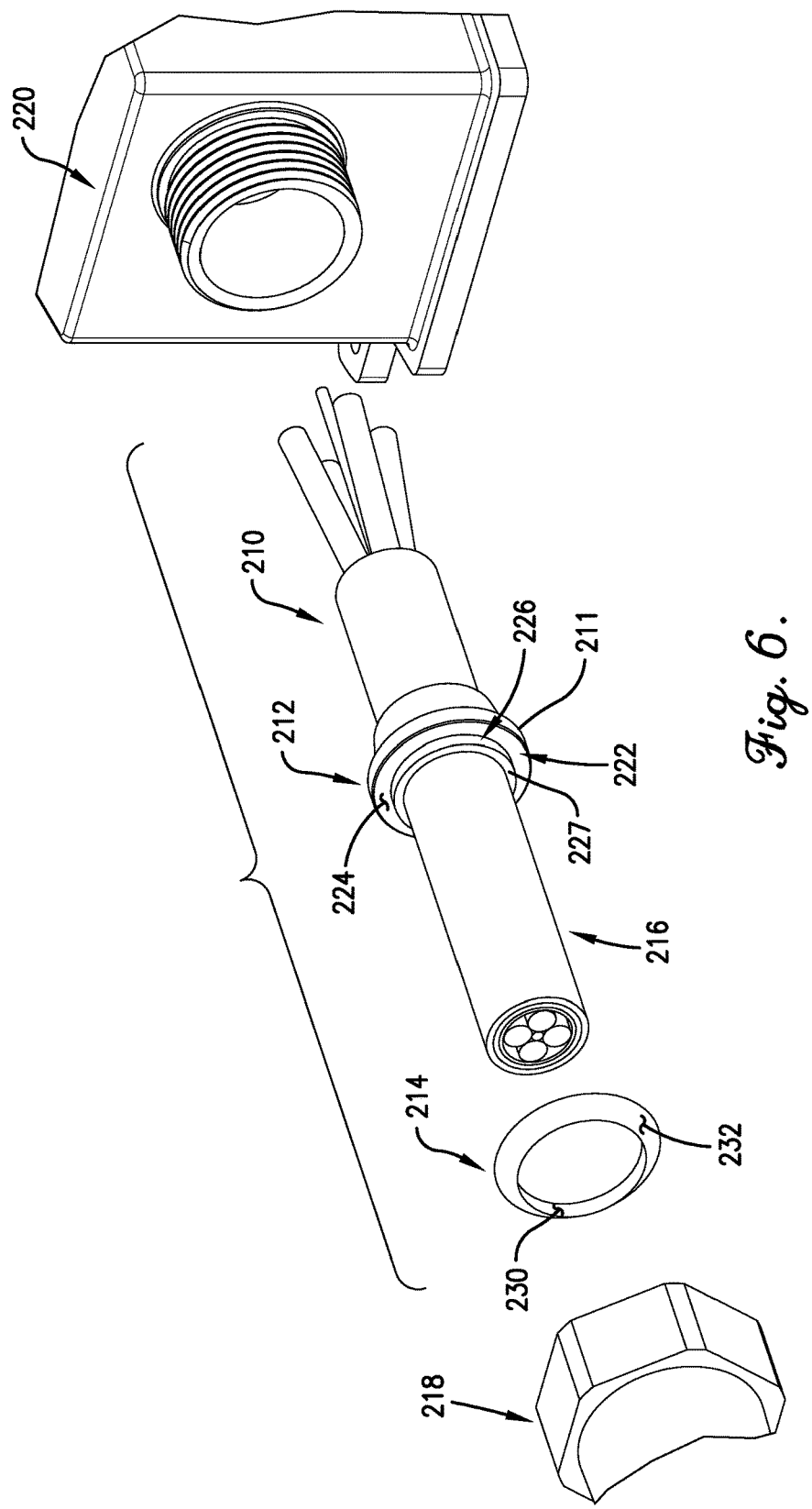
FIG. 6 is an exploded perspective view of a pass-through assembly in accordance with a second preferred embodiment of the present invention.
Figure 7:
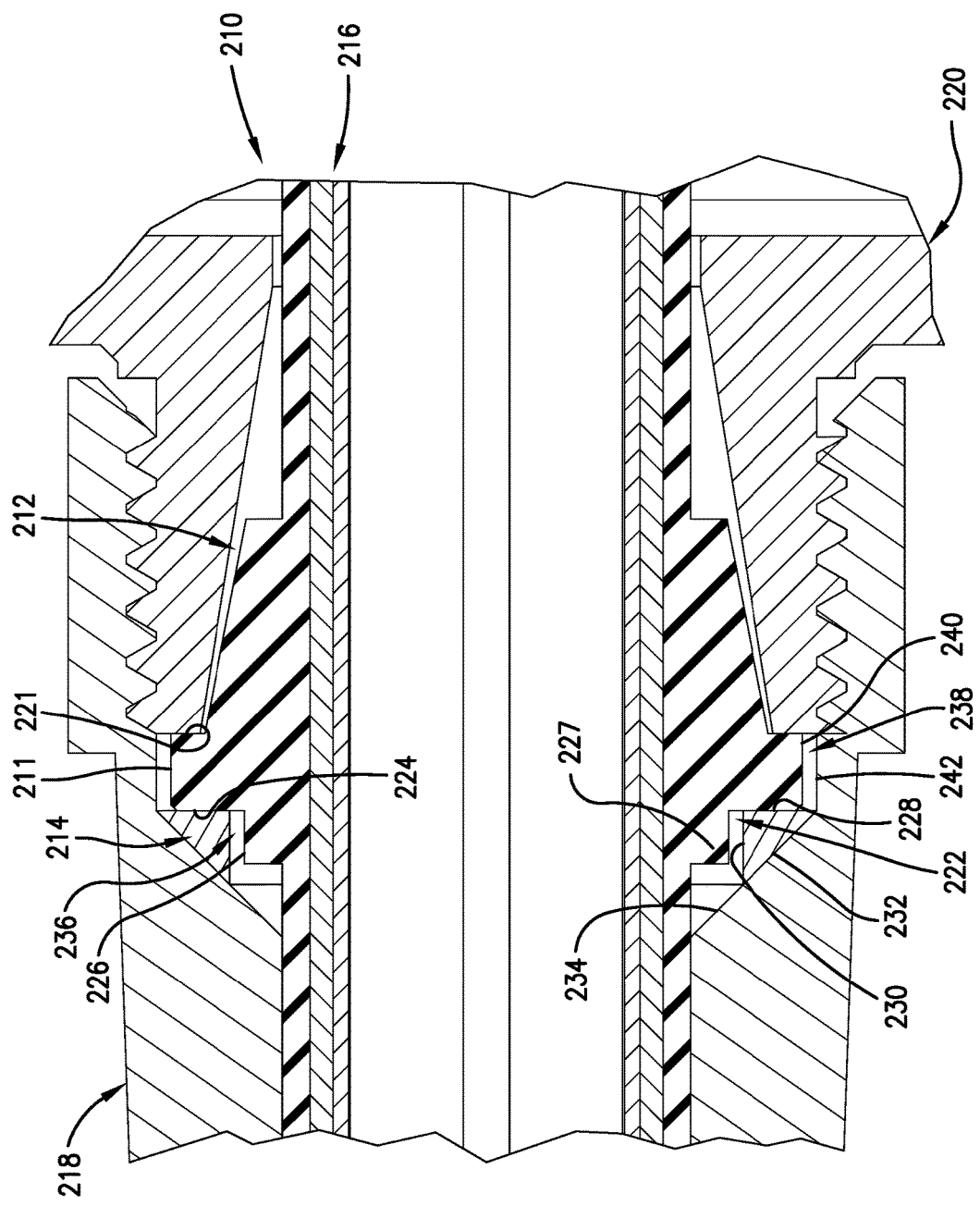
FIG. 7 is an enlarged, cross-sectional side view of the conduit box and pass-through assembly of FIG. 6

A second preferred pass-through assembly is shown in FIGS. 5 and 6. It is initially noted that, with certain exceptions to be discussed in detail below, many of the elements of the pass-through assembly 210 of the second embodiment are the same as or very similar to those described in detail above in relation to the pass-through assembly 34 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

The pass-through assembly 210 of the third preferred embodiment includes an alternatively designed gland 212 and washer 214 associated with a cable 216, dome nut 218, and conduit box 220 designed as described above. The gland 212 and washer 214 are designed to completely eliminate the presence of any radially inward (i.e., compressive forces) in the cable 216 during tightening of the dome nut 218.

More particularly, the gland 212 of the pass-through assembly 210 includes a head 211 that defines an annular, radially extending seal face 221 (similar to that discussed in detail above with regard to the first embodiment). However, the gland 212 additionally includes a washer-receiving recess 222. The recess 222 is generally annular and defined by a radially extending, annular force-receiving face 224 and an axially extending inner face 226. The force-receiving face 224 is spaced axially from and at least in part radially overlaps the seal face 221. Furthermore, the force-receiving face 224 is parallel to the seal face 221.

Alternatively stated, the head 211 includes a crown 227 projecting axially relative to the force-receiving face 224 and presenting the inner face 226 or, alternatively, a radially outermost crown face 226.

The washer 214 is likewise generally annular and presents a triangular cross-section. More particularly, the washer 214 preferably includes a radially extending gland-engaging side 228 parallel to the seal face 221 and the force-receiving face 224, an axially extending radially innermost side 230, and a nut-engaging side 232 extending angularly to connect the gland-engaging side 228 and the radially innermost side 230.

The dome nut 218 preferably includes a force-transmitting face 234 angled obliquely relative to the seal face 221 and the force-receiving face 224 so as to be parallel to the nut-engaging side 322. The washer 214 is disposed at least in part axially between the force-transmitting face 234 and the force-receiving face 224. Upon tightening of the dome nut 218, the force-transmitting face 234 transmits only an axial force to the force-receiving face 224.

More particularly, the force-transmitting face 234 engages the nut-engaging face 222 of the washer 214 and applies a force thereto. Such force is imparted onto the washer 214 in both axial and radial directions due to the angled nature of the contact face relative to the direction of motion. However, the gland-engaging face 228 of the washer 214 engages the receiving face 224 of the washer 214 and, by merit of their shared radial interface, imparts only an axial force thereto.

Furthermore, the inner face 226 of the gland 212 (i.e, the outermost crown face 226) and the radially innermost side 230 of the washer 214 are spaced radially from each other such that an annular gap 236 is defined therebetween. Thus, no force is transferred therebetween. (Likewise, the radially innermost side 230 is spaced radially from the cable 216 such that radial force transfer is avoided therebetween.) Thus, tightening of the dome nut 218 and consequent shifting of the gland 212 (and sealing of the conduit box 220) is achieved without radially compressive forces being transferred by the washer 214 to the gland 212 (and, in turn, to the cable 216).

It is further noted that, most preferably, the washer 214 comprises steel and presents a sufficient hoop strength to, by merit of its own structural integrity, prevent (or allow only negligible) transmission of radial forces even if contact were to occur between the inner faces 226 and the radially innermost side 230. That is, an alternative embodiment is contemplated in which the washer is sized such that the inner faces of the washer and the gland do engage one another, but without appreciable force transfer (or, most preferably, without any force transfer) occurring therebetween, due to the hoop strength of the washer.

An additional annular gap 238 is also preferably defined between a radially outermost face 240 of the head 211 of the gland 212 and an inner wall 242 defined by the nut 218.

Although the gland 212 and the washer 214 as illustrated depict a preferred design for eliminating even minor or negligible compressive forces, it will be readily understood by those of ordinary skill in the art that alternative geometries and interactions may be utilized that take into account the principles of the present invention to similarly eliminate radial compressive force transfer.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention.

What is claimed is:

1. A seal assembly for a longitudinally extending cable, said seal assembly comprising:
   a gland shiftable between an unsealed position and a sealed position; and
   a receiver including an inner portal-defining wall that defines a portal,
   said portal configured to receive at least a portion of the cable,
   said gland being at least in part received within the portal when in the sealed position,
   said receiver further defining a radially extending, annular receiver face,
   said gland including—
      a tapered body configured to circumscribe the cable, and
      a head integrally formed with the tapered body and including an outwardly extending flange,
      said flange presenting a radially extending, annular seal face that engages the receiver face when the gland is in the sealed position,
      said tapered body presenting an axially tapering outer wall,
      said axially tapering outer wall being spaced in its entirety radially inwardly from said portal-defining wall when the gland is in the sealed position, such that an annular buffer is defined between the portal-defining wall and the axially tapering wall,
said seal face extending directly from said axially tapering
said buffer extending axially, directly from the seal face.

2. The seal assembly as claimed in claim 1,
said tapered body and said portal being frustoconical.

3. A seal assembly for a longitudinally extending cable, said seal assembly comprising:
a gland shiftable between an unsealed position and a sealed position; and
a receiver including an inner portal-defining wall that defines a portal,
said portal configured to receive at least a portion of the cable,
said gland being at least in part received within the portal when in the sealed position,
said receiver further defining a radially extending, annular receiver face,
said gland including—
a tapered body configured to circumscribe the cable, and
a head integrally formed with the tapered body and including an outwardly extending flange,
said flange presenting a radially extending, annular seal face that engages the receiver face when the gland is in the sealed position,
said tapered body presenting an axially tapering outer wall,
said outer wall being spaced in its entirety radially inwardly from said portal-defining wall when the gland is in the sealed position, such that an annular buffer is defined between the portal-defining wall and the outer wall and extends axially from the seal face,
said tapered body and said portal being frustoconical,
said buffer having a radial thickness,
said seal face and said outer wall presenting a taper angle therebetween,
said receiver face and said portal-defining wall presenting a portal angle therebetween,
said taper angle being greater than said portal angle, such that the radial thickness of the buffer increases with axial distance from said seal and receiver faces.

4. The seal assembly as claimed in claim 3,
said taper angle and said portal angle each being between about 90 degrees and about 135 degrees.

5. The seal assembly as claimed in claim 4,
said taper angle and said portal angle each being between about 100 degrees and about 103 degrees.

6. The seal assembly as claimed in claim 1,
said seal face being circularly annular.

7. The seal assembly as claimed in claim 1,
said gland comprising a resiliently deformable material.

8. The seal assembly as claimed in claim 1,
said receiver further including an inner guide wall configured to guide the cable and facilitate radial centering of the gland within the portal.

9. The seal assembly as claimed in claim 1,
said seal assembly further comprising a motor conduit box,
said portal extending into the conduit box.

10. The seal assembly as claimed in claim 1,
said tapered body and said head being integrally formed with said cable.

11. The seal assembly as claimed in claim 1,
said seal assembly further comprising a nut circumscribing the gland and the receiver when the gland is in the sealed position,
said nut applying an axial force to the gland to facilitate engagement between the seal face and the receiver face when the gland is in the sealed position.

12. The seal assembly as claimed in claim 11,
said head further including a force-receiving face spaced axially from the seal face and angled obliquely relative to the seal face,
said nut presenting a force-transmitting face angled obliquely relative to the seal face,
said force-transmitting face transmitting being configured to transmit said axial force to said force-receiving face as the gland is shifted from the unsealed position to the sealed position.

13. The seal assembly as claimed in claim 12,
said seal assembly further comprising a washer disposed at least in part axially between the force-transmitting face and the force-receiving face.

14. The seal assembly as claimed in claim 12,
said force-transmitting face being parallel to said force-receiving face.

15. The seal assembly as claimed in claim 11,
said head further including a radially extending, annular force-receiving face spaced axially from and at least in part radially overlapping the seal face,
said force-receiving face being parallel to said seal face,
said nut presenting a force-transmitting face angled obliquely relative to the seal face and the force-receiving face,
said force-transmitting face being configured to transmit said axial force to said force-receiving face as the gland is shifted from the unsealed position to the sealed position.

16. A seal assembly for a longitudinally extending cable, said seal assembly comprising:
a gland shiftable between an unsealed position and a sealed position; and
a receiver including an inner portal-defining wall that defines a portal,
said portal configured to receive at least a portion of the cable,
said gland being at least in part received within the portal when in the sealed position,
said receiver further defining a radially extending, annular receiver face,
said gland including—
a tapered body configured to circumscribe the cable, and
a head integrally formed with the tapered body and including an outwardly extending flange,
said flange presenting a radially extending, annular seal face that engages the receiver face when the gland is in the sealed position,
said tapered body presenting an axially tapering outer wall,
said outer wall being spaced in its entirety radially inwardly from said portal-defining wall when the gland is in the sealed position, such that an annular buffer is defined between the portal-defining wall and the outer wall and extends axially from the seal face,
said seal assembly further comprising a nut circumscribing the gland and the receiver when the gland is in the sealed position, said nut applying an axial force to the gland to facilitate engagement between the seal face and the receiver face when the gland is in the sealed position, said head further including a radially extending, annular force-receiving face spaced axially from and at least in part radially overlapping the seal face, said force-receiving face being parallel to said seal face, said nut presenting a force-transmitting face angled obliquely relative to the seal face and the force-receiving face, said force-transmitting face being configured to transmit said axial force to said force-receiving face as the gland is shifted from the unsealed position to the sealed position, said seal assembly further comprising a washer disposed at least in part axially between the force-transmitting face and the force-receiving face, said washer presenting a triangular cross-section so as to include—
 a nut-engaging side parallel to the force-transmitting face, and
 a gland-engaging side parallel to the seal face and the force-receiving face.

17. The seal assembly as claimed in claim 16,
said washer further including a radially innermost side extending between and interconnecting the nut-engaging side and the gland-engaging side,
said radially innermost side being spaced radially from said cable such that radial force transfer is avoided therebetween.

18. The seal assembly as claimed in claim 17,
said head including a crown projecting axially relative to the force-receiving face and presenting a radially outermost crown face,
said radially innermost side of the washer being spaced radially from said radially outermost crown face such that an annular gap is defined therebetween,
said gap eliminating radial force transfer between the washer and the gland when the gland is in the sealed position.

19. The seal assembly as claimed in claim 3,
said tapered body and said head being integrally formed with said cable.

20. The seal assembly as claimed in claim 16,
said tapered body and said head being integrally formed with said cable.

\* \* \* \* \*